United States Patent
Jadidzadeh et al.

(10) Patent No.: US 10,563,827 B2
(45) Date of Patent: Feb. 18, 2020

(54) SOLAR POWERED ILLUMINATION SYSTEM

(71) Applicants: Reza Jadidzadeh, Tehran (IR); Farid Javidzadeh Ershadi, Tehran (IR); Soroush Masoumzadeh, Tehran (IR); Keyvan Esmaeilzadeh, Tehran (IR); Mostafa Hassanahmadi, Tehran (IR)

(72) Inventors: Reza Jadidzadeh, Tehran (IR); Farid Javidzadeh Ershadi, Tehran (IR); Soroush Masoumzadeh, Tehran (IR); Keyvan Esmaeilzadeh, Tehran (IR); Mostafa Hassanahmadi, Tehran (IR)

( * ) Notice: Subject to any disclaimer, the term of this patent is extended or adjusted under 35 U.S.C. 154(b) by 0 days.

(21) Appl. No.: 16/225,447

(22) Filed: Dec. 19, 2018

(65) Prior Publication Data

US 2019/0128487 A1 May 2, 2019

Related U.S. Application Data

(60) Provisional application No. 62/723,173, filed on Aug. 27, 2018.

(51) Int. Cl.
| | | |
|---|---|---|
| F21S 9/03 | (2006.01) | |
| F21S 2/00 | (2016.01) | |
| H02J 7/35 | (2006.01) | |
| F21V 29/70 | (2015.01) | |
| H05B 33/08 | (2020.01) | |
| H02S 40/38 | (2014.01) | |
| F21V 23/04 | (2006.01) | |
| F21Y 115/10 | (2016.01) | |

(52) U.S. Cl.
CPC ............ *F21S 2/005* (2013.01); *F21S 9/035* (2013.01); *F21V 29/70* (2015.01); *H02J 7/35* (2013.01); *H02S 40/38* (2014.12); *H05B 33/0845* (2013.01); *F21V 23/0471* (2013.01); *F21Y 2115/10* (2016.08)

(58) Field of Classification Search
CPC .... F21S 9/035; F21S 8/032; F21S 8/08; F21S 8/085; F21S 8/086; F21S 8/888; F21S 9/02; F21S 9/03; F21S 9/032; F21S 9/037
See application file for complete search history.

(56) References Cited

U.S. PATENT DOCUMENTS

| | | | | |
|---|---|---|---|---|
| 4,200,904 A * | 4/1980 | Doan | ...................... | F21S 8/086 136/291 |
| 4,281,369 A * | 7/1981 | Batte | ...................... | F21S 8/086 136/291 |
| 4,315,163 A * | 2/1982 | Bienville | .................. | H02J 9/04 136/248 |
| 5,149,188 A * | 9/1992 | Robbins | .................. | F21S 8/086 136/291 |
| 6,942,361 B1 * | 9/2005 | Kishimura | .............. | F21S 8/086 362/240 |
| 7,832,892 B2 * | 11/2010 | Xiao | ........................ | F21S 8/086 362/145 |

(Continued)

*Primary Examiner* — Ismael Negron
(74) *Attorney, Agent, or Firm* — Barry Choobin; Patent 360

(57) ABSTRACT

The illumination system includes at least one solar panel, a charge controller, a rechargeable battery, an illumination unit connected to the battery through the controller, and a base frame supporting the solar panel and illumination unit at a top portion thereof, with the battery provided in a bottom portion of the base frame.

6 Claims, 3 Drawing Sheets

(56) References Cited

U.S. PATENT DOCUMENTS

| | | | |
|---|---|---|---|
| 7,954,977 B2* | 6/2011 | Anderson | F21L 4/08 362/183 |
| 7,972,025 B2* | 7/2011 | Chen | H05B 33/0809 362/183 |
| 7,976,180 B1* | 7/2011 | Haun | F21S 8/086 362/153.1 |
| 7,980,725 B2* | 7/2011 | Yu | F21S 8/085 362/218 |
| 7,988,320 B2* | 8/2011 | Brumels | F21S 8/086 248/299.1 |
| 7,997,754 B2* | 8/2011 | Zhang | F21S 8/085 136/246 |
| 8,106,593 B2* | 1/2012 | Nevins | F03D 9/25 315/149 |
| 8,714,768 B2* | 5/2014 | Tittle | F21S 8/086 362/183 |
| 9,046,235 B2* | 6/2015 | Wilson | F21S 9/035 |
| 9,273,840 B1* | 3/2016 | Braun | F21S 9/035 |
| 9,920,895 B2* | 3/2018 | Diamond | F21S 8/085 |
| 2008/0298051 A1* | 12/2008 | Chu | F21S 8/086 362/183 |
| 2009/0034258 A1* | 2/2009 | Tsai | H05B 37/02 362/253 |
| 2009/0080182 A1* | 3/2009 | Huang | F21S 8/086 362/183 |
| 2011/0018448 A1* | 1/2011 | Metchear, III | F21S 8/083 315/152 |
| 2011/0074334 A1* | 3/2011 | Wang | G07F 11/00 320/101 |
| 2013/0141902 A1* | 6/2013 | Akdag | F21S 8/086 362/191 |
| 2014/0062188 A1* | 3/2014 | Watanabe | F21V 21/10 307/18 |
| 2014/0355259 A1* | 12/2014 | Ku | F21S 9/037 362/183 |

* cited by examiner

SOLAR POWERED ILLUMINATION SYSTEM

BACKGROUND

Technical Field of Invention

The embodiments herein generally relate to an illumination system and particularly relates to a solar based illumination system with low power usage, standard optical flux and enhanced lifetime. The embodiments herein more particularly relate to an illumination system adapted to work with both solar panels and a main power supply during an off-grid and an on-grid installation respectively.

Description of Related Art

Solar panels are frequently used to recharge batteries during the day that then subsequently are able to power lights at night. Solar panels may serve multiple functions, and, although it is very common for a solar panel to be positioned away from a light source, some outdoor light assemblies use a solar panel as a cover to a container that contains electronics and other components that need to be protected against water exposure and inclement weather. Solar light assemblies may be positioned at variable heights from the ground, with variable difficulty and safety issues associated. Conventionally, it is safe and easy to service solar light systems that are close to the ground, such as walkway and construction lights.

To develop efficient solar based illumination panels various technologies have been adopted. One of such prior art technologies discloses a solar street light includes a lamp housing equipped with a bracket for mounting at a street light pole and photovoltaic panels for converting sunlight into electric energy, the lamp housing including a top panel, multiple peripheral panels, an accommodation chamber surrounded by the top panel and the peripheral panels, a fixed bottom panel and a movable bottom panel covering the accommodation chamber, a light source module mounted at an inner side of the movable bottom panel, and a battery set mounted in the accommodation chamber in between the top panel and the fixed bottom panel.
Note: Battery is in a separate box for all split types (not in the panels). Battery box can be installed in one of three positions: under the solar panel, middle of the pole, or buried in waterproof box at the base of the pole. There are also integrated solar lighting systems where battery, controller modules, and solar panel are all together in one fixture.

A plurality of similar prior art technologies in solar illumination panels specifically for street usage have been adopted. But such panels face limitation during operation in cloudy conditions. Further, the prior art solar panels have low life sustenance and heavy assembly structure which requires frequent maintenance leading to increase in overall operational cost of the prior art solar panels (probably should state solar solution not solar panel). The prior arts further face limitation in power output and optical flux, thus considered as inefficient illumination sources.

In the view of foregoing, there is a need for an illumination system with low power consumption and providing standard optical flux resulting in high visibility and illumination coverage. Also, there is a need for an illumination system with high life sustenance and ability to provide an output even during cloudy conditions.

SUMMARY OF THE INVENTION

The primary objective of the embodiments is to provide an illumination system with low power consumption and providing standard optical flux resulting in high visibility and illumination coverage.

Another objective of the embodiments herein is to provide an illumination system with high life sustenance and ability to provide an output even during cloudy conditions.

Yet another object of the embodiments herein is to provide an illumination system with low offset percentage by implementing loss-of-load probability index.

The various embodiments herein provide a solar based illumination system. The system comprises a solar panel unit, an illumination unit, and a base frame. The solar panel unit comprises at least one solar panel, a charge controller and a rechargeable battery. The solar panel is connected to the rechargeable battery through the charge controller. The illumination unit is connected to the rechargeable battery through the charge controller. At least one solar panel and the illumination unit are fitted on vertically top position of the base frame through an arm and the rechargeable battery is under the solar panel, middle of the pole, or buried in waterproof box at the base of the pole.

According to one embodiment herein, the illumination unit comprises a heat sink. The heat sink is provided on an upper surface of an enclosure housing the illumination panel.

According to one embodiment herein, the charge controller is programmed to sense a voltage output from the solar panel unit, wherein the illumination unit is activated on dropping of the voltage output below 5V and programmable to higher voltage.

According to one embodiment herein, a beam angle of the illumination panel ranges from 5°-180° with respect to a vertical axis.

According to one embodiment herein, the illumination panel has an input power to output luminescence ratio of 1:170, based on actual power consumption.

According to one embodiment herein, a loss of load probability index (LOLP) is nearly zero for the illumination unit. The luminescence of the illumination unit is constant for 5-7 nights or 8-10 nights (based on configuration and geographical location) in inclement weather and gradually starts to decrease in the next 5-8 nights.

According to one embodiment herein, the illumination unit provides has' luminous flux ranging from 6,000-40,000 lumens equivalent to standard LED lighting with nominal input power ranging from 60-400 watts but actual power consumption of the present invention's illumination system is 30-40% less than the standard LED lights.

According to one embodiment herein, the illumination system works both with the solar panels during off-grid installation or a main power supply during an on-grid installation.

According to one embodiment herein, the charge controller implements a buck-boost converter for charging the rechargeable battery at even lower voltages during an inclement weather. The charge controller uses weak electric shocks with a pulse ramp to charge the rechargeable battery with at least 6 Volts to provide 25-40% charging in inclement weather. The charging at lower input voltage increases the battery life by at least 3 times compared to conventional technologies.

According to one embodiment herein, the illumination panel has a dedicated feed for each illumination unit or LED separately. The dedicated feed prevents an effect of a malfunction of one illumination unit on the remaining illumination units of the illumination panel.

According to one embodiment herein, the illumination system functions in an islanding mode during a low battery operation. The islanding mode maintains a luminescence of an illumination unit by maintaining a constant level of power through automated adjustment of an input voltage and current.

These and other aspects of the embodiments herein will be better appreciated and understood when considered in conjunction with the following description and the accompanied drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanied drawings in which.

DETAILED DESCRIPTION OF THE DRAWINGS

In the following detailed description, a reference is made to the accompanied drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1A:
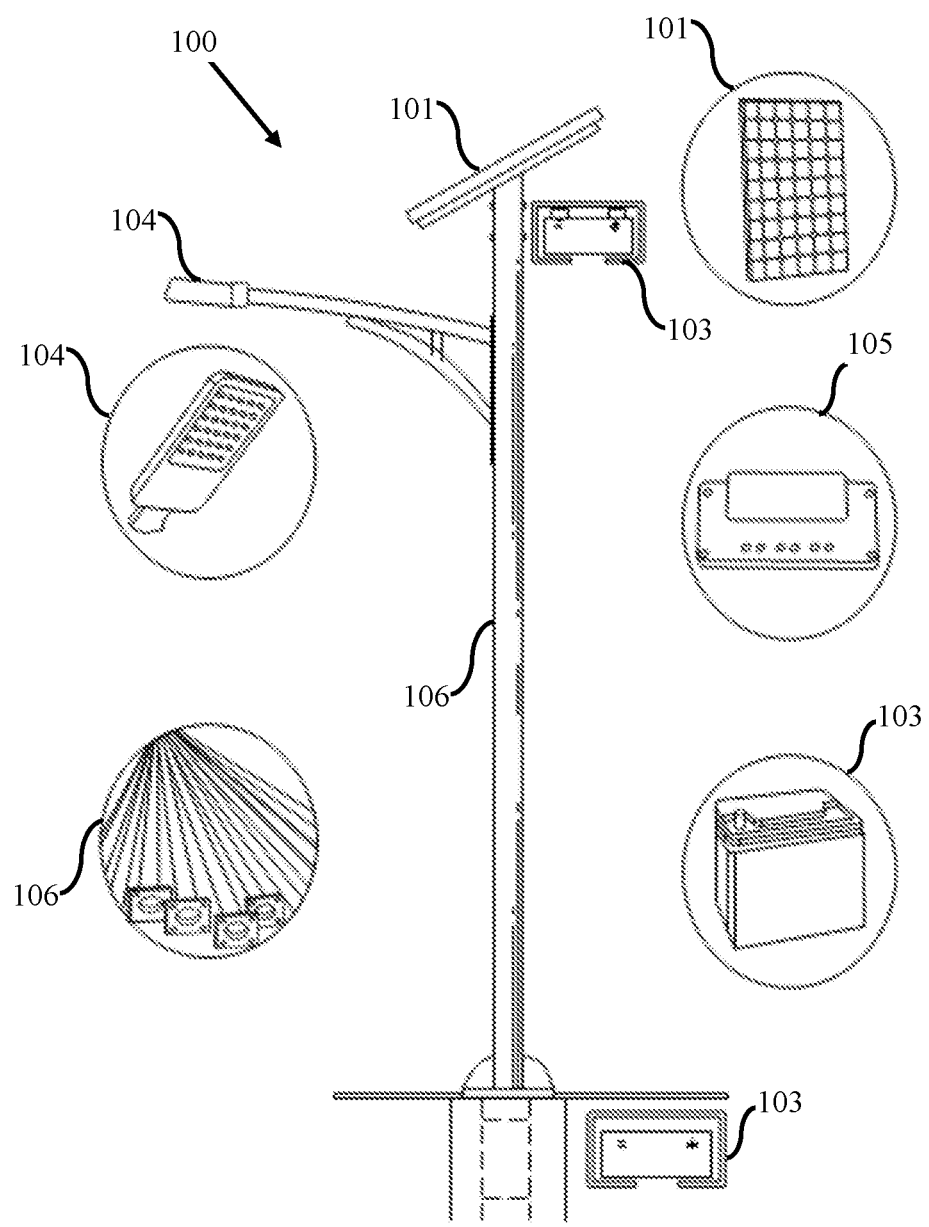
FIGS. 1a and 1b illustrates a side view and a side perspective view respective of a solar based illumination system, according to one embodiment herein.
Figure 1B:
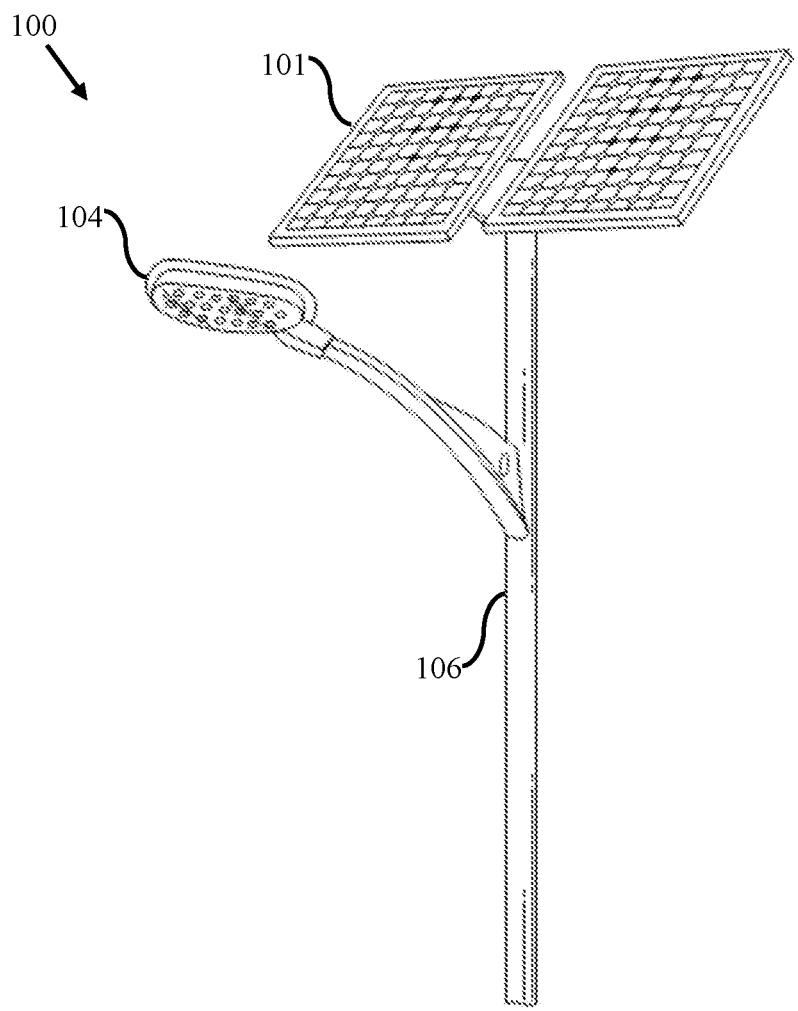
Figure 1C:
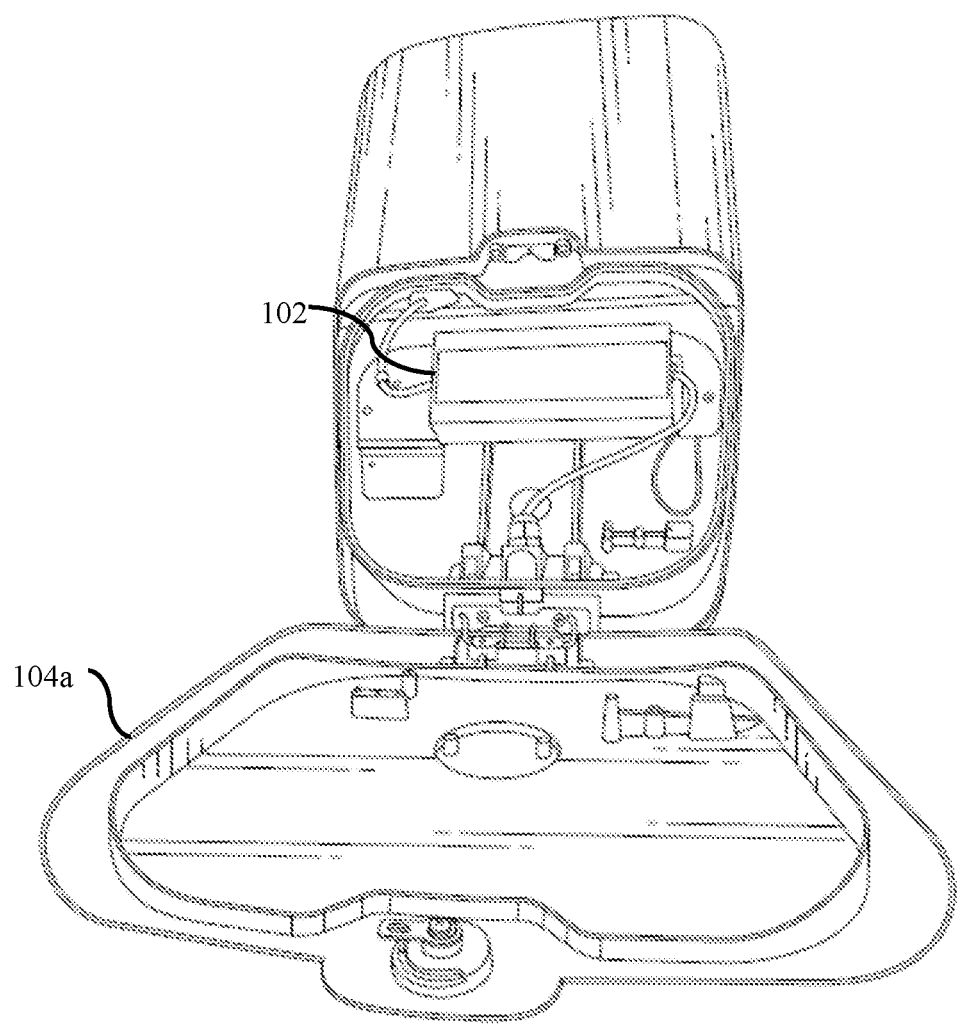
FIG. 1c illustrates a front vie of an enclosure of the illumination panel with a charge controller housed in the enclosure, according to one embodiment herein.

FIGS. 1a and 1b illustrates a side view and a side perspective view respective of a solar based illumination system, according to one embodiment herein. With respect to FIGS. 1a and 1b, the illumination system 100 is primarily installed for a street illumination while the system 100 is further optimized to be used in lighting a building perimeter as well as closed spaces. The system 100 comprises a solar panel unit, an illumination unit 104, and a base frame 106. The solar panel unit comprises at least one solar panel 101, a charge controller 102 and a rechargeable battery 103. The charge controller 102 can be next to the rechargeable battery 103, or inside an enclosure of the illumination unit 104a (as shown in FIG. 1c). The solar panel 101 is connected to the rechargeable battery 103 through the charge controller 102. The illumination unit 104 is connected to the rechargeable battery through the charge controller 102. At least one solar panel 101 and the illumination unit 104 are fitted on vertically top position of the base frame and the rechargeable battery 103 is fitted in one of three positions: below the solar panel 101, in the middle of the base frame 106, or buried in the waterproof box at the base of the base frame 106.

According to one embodiment herein, the illumination unit comprises a heat sink 105. The heat sink 105 is provided on an upper surface of the enclosure 104a housing the illumination unit 104.

According to one embodiment herein, the charge controller is programmed to sense a voltage output from the solar panel unit, wherein the illumination unit is activated on dropping of the voltage output below 5V and programmable to higher voltage.

According to one embodiment herein, a beam angle of the illumination panel ranges from 5°-180° with respect to a vertical axis.

According to one embodiment herein, the illumination panel has an input power to output luminescence ratio of 1:170, based on actual power consumption.

According to one embodiment herein, a loss of load probability index (LOLP) is nearly zero for the illumination unit. The luminescence of the illumination unit is constant for 5-7 nights or 8-10 nights (based on configuration and geographical location) in inclement weather and gradually starts to decrease in the next 5-8 nights.

According to one embodiment herein, the illumination unit provides luminous flux ranging from 6,000-40,000 lumens equivalent to standard LED lighting nominal input power ranging from 60-400 watts but actual power consumption of our illumination system is 30-40% less than the standard LED lights.

The solar panel is connected to the charge controller for regulating an input current to the rechargeable battery. The charge controller is customizable to provide highly efficient power utility. The charge controller senses a charge status of the rechargeable battery and routes an excess charge current to the illumination unit for increasing an input to output power efficiency. The charge controller further controls the power input to the illumination unit. The illumination unit is connected to the heat sink which reduces a temperature increase in the illumination unit caused due to continuous output of high intensity light. The charge controller opens and closes a switch between the rechargeable battery and the illumination unit on the basis of voltage output from the solar panel unit.

According to one embodiment herein, the illumination system possesses high efficiency in cloudy, rainy, snowy and dusty areas due to efficient charging of the rechargeable battery and energy conservation.

The illumination system further implements a programmable charge controller or a motion sensor in areas where the daytime is too short. The illumination system increases a power back-up to 14-20 days. When the motion sensor detects an object movement from a specific distance, the illumination system starts working with 100% of power, otherwise the illumination system works at 20-40% of a rated power value based on pre-defined programming.

Furthermore, the charge controllers are programmed based on duration of a night in a geographical location such as 8 hours in summer and 12-14 hours in winter. On the basis of night duration, a light intensity is programmed to be at 100% for the first 4 hours, 50% for the following 4 hours and 20% for the rest of the night until the sunrise.

According to one embodiment herein, for installing the illumination system in desert or snowy areas following customizations are adopted:
  a. Increasing a tilt angle of the solar panels during installation without decrease in the solar light absorption. The solution reduces an accumulation of dust, snow and rain on the surface of the solar panel.

b. Using a self-cleansing Nano-coating on the solar panels to decrease a friction on the surface of the solar panel which also prevents the accumulation of dust, snow and rain on the surface of the solar panel.

According to one embodiment herein, the illumination unit is primarily made up of Light Emitting Diode (LED) module. The LED modules have standard luminous flux and low power intake. The LED module is housed in a metallic casing comprising heat sink that exchanges a heat generated during illumination of the LED module. Thus, a load on the rechargeable battery reduces as the LED module keeps functioning at optimal rating for a longer time period without heat loss. The reduction in heat loss also prevents the LED lamps from getting damaged resulting in maintenance of lowest offset percentage with reference to loss-of-load probability (LOLP) index. The reduction in heat effect on the illumination panel increases a lifespan of the illumination panel by manifolds.

The LED module intakes less power to generate a luminescence equivalent to other light sources such as high-pressure sodium lamps, metal halide lamps, and high intensity lamps. The LED modules in the present system also has a wide area coverage by using less power input even comparing conventional LED modules in the market. The conservation of the power leads to running of the rechargeable batteries for 2-3 times longer than the rechargeable batteries implemented in the conventional illumination systems. The illumination system facilitates decrease in a number of charging/discharging cycles of the rechargeable battery, which in turn results in longer battery and charge controller lifetime. The illumination system further has reduced maintenance cost primarily due to the longer lifetime.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:
1. A solar based illumination system comprising:
a solar panel unit, having at least one solar panel, a rechargeable battery and a charge controller electrically interconnecting the solar panel and the rechargeable battery;
at least one illumination panel electrically connected to the rechargeable battery through the charge controller; and
a base frame supporting the at least one solar panel and the illumination panel at a vertically top position of the base frame, with the rechargeable battery attached to a bottom surface of the base frame,
wherein, the charge controller is configured to sense a voltage output from the solar panel, activate the illumination unit when the voltage output is below a predetermined value, regulate an input current to the battery, sense a charge status of the battery, and based on the charge status, route an excess of the input current to the illumination unit; and
wherein the luminescence of the illumination unit is constant for 5-10 nights in low light conditions and gradually decreases for next 5-8 nights.
2. The illumination system according to claim 1, wherein the predetermined value is 5V.
3. The illumination system according to claim 1, wherein power consumption of the illumination system is in the range of 36 watts to 280 watts.
4. The illumination system according to claim 1, wherein the charge controller implements a buck-boost converter for charging the rechargeable battery at lower voltages during an inclement weather.
5. The illumination system according to claim 1, the at least one illumination panel includes a plurality of illumination panels, each of such illumination panels connected in parallel with the charge controller such that, upon failure of one of the illumination panels, the other illumination panels continue to function.
6. The illumination system according to claim 1, wherein charging controller is configured to provide a constant power level to the illumination unit.

* * * * *